(12) United States Patent
Dreger et al.

(10) Patent No.: US 6,390,943 B1
(45) Date of Patent: May 21, 2002

(54) RETAINER SUBASSEMBLY FOR AND IN COMBINATION WITH A MASTER LINK FOR A CHAIN

(76) Inventors: Kurt W. Dreger, 1616 Portland Ave.;
John W. Dreger, 1620 Portland Ave.;
Lornell Grayson, 12782 Scenic Bluff Rd., all of Savanna, IL (US) 61074

( * ) Notice: Subject to any disclaimer, the term of this patent is extended or adjusted under 35 U.S.C. 154(b) by 0 days.

(21) Appl. No.: 09/577,878

(22) Filed: May 25, 2000

(51) Int. Cl.[7] .......................... F16G 13/02; F16G 15/00
(52) U.S. Cl. ........................................ 474/220; 474/223
(58) Field of Search ................................ 474/230, 220, 474/231, 155, 156, 223, 218, 157, 224–225, 206; 59/84, 78, 901; 403/154, 155

(56) References Cited

U.S. PATENT DOCUMENTS

| | | | | |
|---|---|---|---|---|
| 2,703,020 A | * | 3/1955 | Fish | 474/223 |
| 3,021,718 A | | 2/1962 | King | |
| 3,877,688 A | | 4/1975 | McCarty | |
| 3,885,445 A | * | 5/1975 | Montano | 474/231 X |
| 3,939,721 A | * | 2/1976 | Kuenzig et al. | 474/220 |
| 4,041,580 A | * | 8/1977 | Turner et al. | 403/154 X |
| 4,041,790 A | * | 8/1977 | Paul | 474/220 |
| 4,060,006 A | * | 11/1977 | Abel et al. | 474/231 X |
| 4,099,424 A | * | 7/1978 | Pemberton | 474/156 |
| 4,941,316 A | * | 7/1990 | Bechtold | 59/78 |
| 5,139,464 A | * | 8/1992 | Lehnert | 474/155 |
| 5,299,416 A | | 4/1994 | Wu | |
| 5,305,594 A | | 4/1994 | Wang | |
| 5,308,292 A | * | 5/1994 | Mistry | 474/207 |
| 5,400,585 A | | 3/1995 | Wang | |
| 5,778,655 A | | 7/1998 | Lange | |

FOREIGN PATENT DOCUMENTS

| | | | |
|---|---|---|---|
| FR | 2240116 | * | 3/1975 |
| SU | 1518594 | | 5/1987 |

\* cited by examiner

*Primary Examiner*—David A. Bucci
*Assistant Examiner*—Marcus Charles
(74) *Attorney, Agent, or Firm*—Nixon & Vanderhye

(57) ABSTRACT

A retainer subassembly for a master link of a chain includes a cover plate, a pair of snap rings and a strap plate. The cover plate includes a pair of stepped recesses terminating in openings adjacent the outer face of the cover plate for receiving the spaced pins of a master link. Snap rings having radially inwardly extending and axially outwardly inclined tangs are disposed in the recesses. A strap plate overlies the inside face of the cover plate. To apply the retainer subassembly to the master link, the holes through the retainer subassembly are aligned with the pins and the retainer subassembly is pushed onto the pins. Once the flanges of the snap rings pass the ends of the pins, the flanges resiliently snap into the annular grooves of the pins retaining the retainer subassembly on the master link.

9 Claims, 7 Drawing Sheets

RETAINER SUBASSEMBLY FOR AND IN COMBINATION WITH A MASTER LINK FOR A CHAIN

BACKGROUND

The present invention relates to a retainer subassembly for use with the master link of an endless chain and particularly relates to a retainer subassembly for readily and easily engaging the free ends of the pins of a master link for a chain.

Endless chains typically have a master link which forms the final link in the chain during assembly and disassembly of the chain. The master link typically includes a pair of pins having annular grooves adjacent free ends and connected to one another at their opposite ends by a link. The pins pass through roller links thereby joining the opposite ends of the chain to one another through the master link to form an endless chain. The free ends of the pins of the master link, once inserted through the roller pins of the adjoining chain ends, are conventionally connected to one another by a retainer plate overlaid by a spring clip. The spring clip is typically a generally U-shaped clip having a pair of openings, the margins of which engage in the annular grooves of the free ends of the pins. The U shaped clip is resilient and thus the legs of the clip can be separated one from the other to engage the pin ends in the respective openings of the spring clip. When the clip resiliently closes, the clip retains the retainer plate and roller links on the roller pins of the chain and hence retains the chain in its endless chain configuration.

There are number of problems associated with a spring clip of this type for use with a chain master link. For example, the legs of the spring clip may come separated from one another enabling the spring clip to disengage from the annular groove or grooves of the pin ends. Should that occur, the retainer plate may be freed from one or both of the pin ends with the result that the roller links can become separated from the pins separating the chain. Additionally, the spring clip is somewhat difficult to apply to the master link and also to remove from the master link. The spring clip is relatively small in size and difficult to handle rendering it difficult to open the legs of the clip against their bias to apply the clip to the pin ends. Moreover, in both applying the spring clip to the master link pins and removing it from those pins, the bias at the clip legs sometimes causes the clip to spring off the master link and poses a danger to the individual attempting to assemble or disassemble the chain. Further, the spring clip must be in a position such that its open end faces reverse to the direction of chain rotation and if not faced in that direction, the spring clip is prone to snagging and may possibly be torn loose from the chain during operation. Accordingly, there is a need for a retainer subassembly for use with a conventional master link which is easy to apply and remove from the master link, does not require a tool for securing the retainer subassembly to the master link and which retainer subassembly may be simply be snapped into place.

SUMMARY OF THE INVENTION

In a preferred embodiment of the present invention, there is provided a retainer subassembly for application to the free or distal ends of the pins of a master link which is easy to apply and remove relative to the chain, does not require any tool for applying the retainer subassembly to the master link, does not require orientation relative to the master link, and is simply snapped onto the master link with the assurance that the retainer subassembly has been properly installed. Particularly, the retainer subassembly in a preferred form hereof includes a strap plate, a pair of snap rings and a cover plate. The strap plate has a pair of openings spaced from one another corresponding to the spacing of the pins of the master link for receiving the free ends of the master link pins. The cover plate includes a pair of recesses or counterbores along one side of the plate for receiving the snap rings. The recesses are spaced along the plate from one another in distance corresponding to the spacing between the pins of the master link and hence in assembly register with the openings of the strap plate. The snap rings are applied in the recesses of the cover plate. The snap rings comprise an annular outer band having circumferentially spaced radially inwardly directed flanges or tangs inclined axially outwardly of the plane of the annular outer band. The tangs or flanges project into the smaller diameter stepped recess of the cover plate and face outwardly away from the master link in final assembly.

To employ the retainer subassembly hereof, the cover plate, snap rings and strap plate are preassembled and secured to one another by a fastener for example a rivet passing through the cover plate and the strap plate. The flanges or tangs of the snap rings have an inner diameter less than the diameter of the pins. By applying the assembled retainer to the ends of the pins with the strap plate engaging over the pin ends, it will be appreciated that the tangs or flanges flex resiliently outwardly into the smaller diameter recesses as the pins are received through the snap rings and into the cover plate openings. Once past the outer ends of the pins, the flanges or tangs resiliently return to engage in the grooves of the pin ends to retain the retainer subassembly on the master link. Thus it will be appreciated that the retainer may be simply pushed onto the ends of the pins of the master link and is retained on the master link by the engagement of the tangs or flanges in the grooves of the free ends of the pins.

In a further form of the present invention, the retainer subassembly may comprise a retainer plate having spaced openings corresponding to the spacing of the pins of the master link. The openings of the retainer plate are larger in diameter than the diameter of the pins of the master link. In a recessed outer face of the retainer plate extending between the openings, a flat leaf spring is secured in a longitudinally extending groove such that its opposite ends terminate within the openings of the retainer plate. The retainer plate may then be applied over the free ends of the pins of the master link. As the retainer plate is applied, the spring ends flex outwardly and then snap into engagement in the annular grooves of the pins to retain the retainer plate on the master link. Preferably the outer ends of the pins of the master link beyond the annular grooves may be bevelled to facilitate passage of the outer pin ends past the spring ends upon application of the retainer plate to the master link.

In a still further form of the present invention, a single retainer plate having spaced openings corresponding to the spacing of the master link pins is provided. Each opening has a step along its interface. Each pin has a reverse bent leaf spring with one leg secured to the end of the pin. When the retainer plate is applied to the pin ends mounting the bent leaf springs, the margin of each opening flexes the free end of the leaf spring inwardly. Once past the end of the leaf spring, it flexes resiliently outwardly to engage in the step preventing removal of the retainer plate from the master link. The retainer plate is prevented from inward movement by shoulders on the pins of the master link or by the roller links connecting the master link to the reminder of the chain.

DESCRIPTION OF A PREFERRED EMBODIMENT

Figure 1:
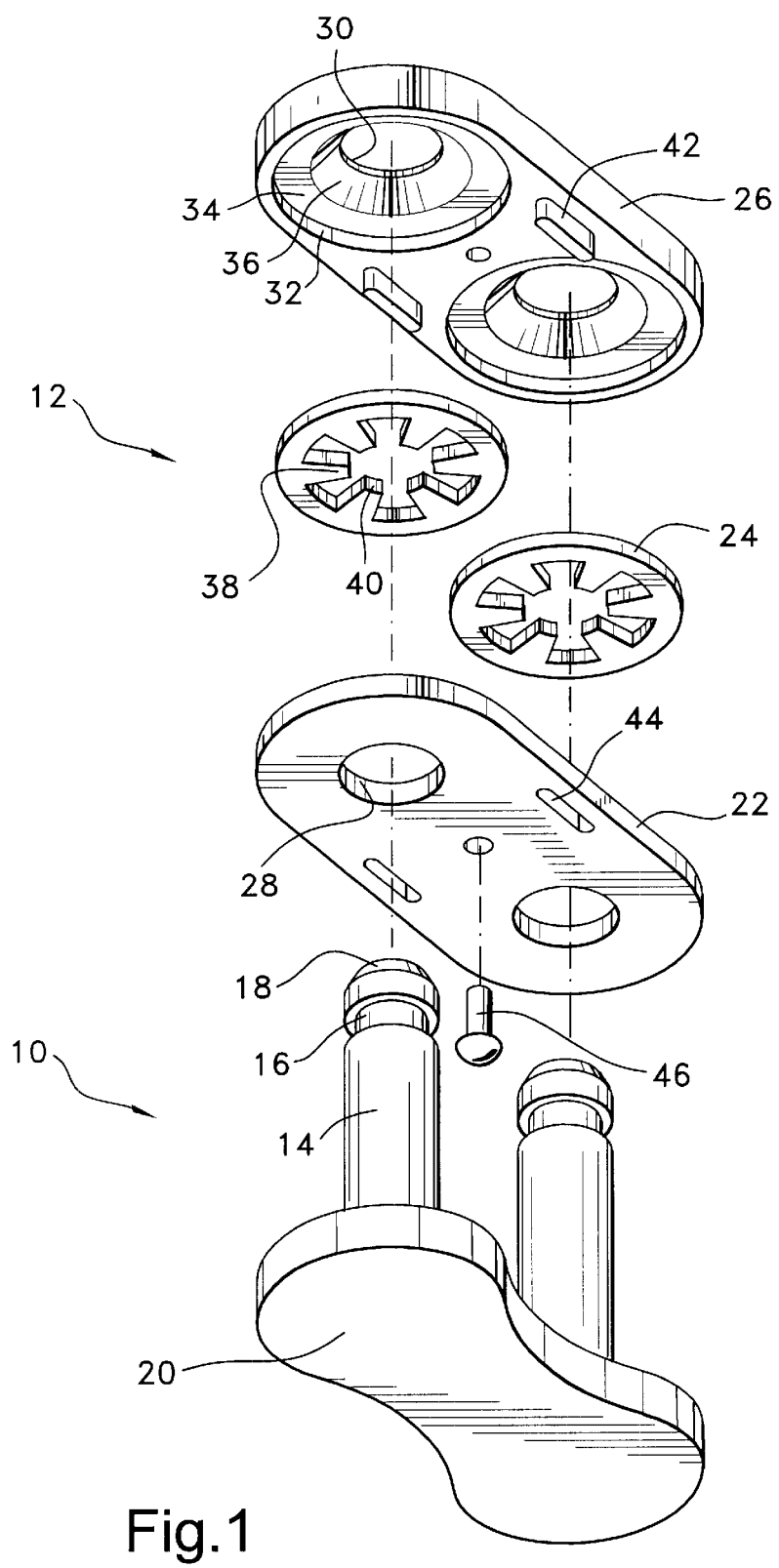
FIG. 1 is an exploded perspective view illustrating a master link and the parts of a retainer subassembly constructed in accordance with a preferred embodiment of the present invention.
Figure 2:
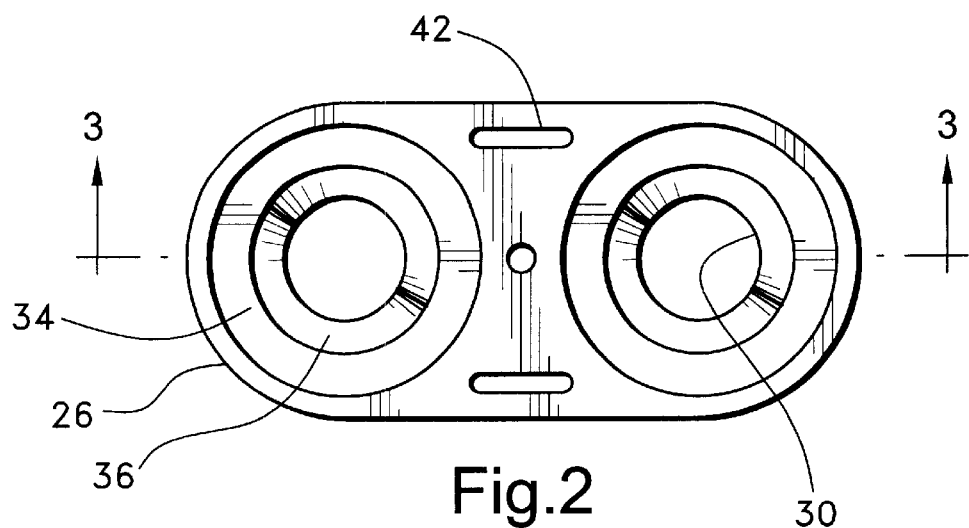
FIG. 2 is a plan view of the cover plate forming part of the retainer assembly.
Figure 3:
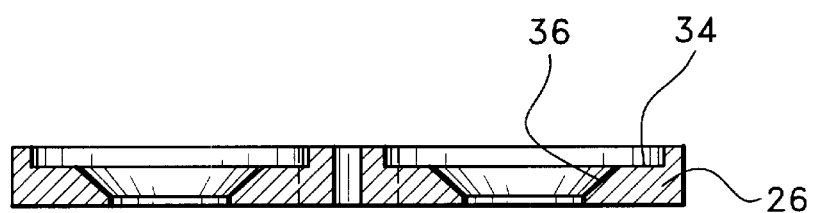
FIG. 3 is a cross-sectional view thereof taken generally bout on line 3—3 of FIG. 2.
Figure 4:
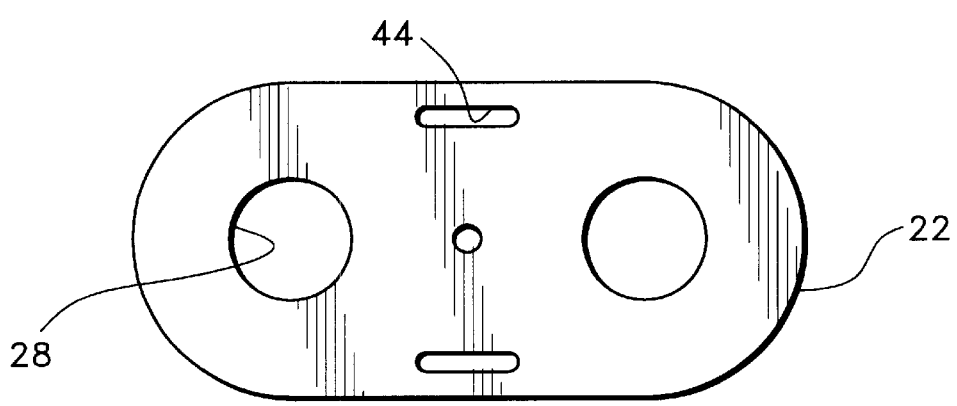
FIG. 4 is a plan view of the cover plate illustrated in FIG. 2 from the opposite side thereof.
Figure 5:
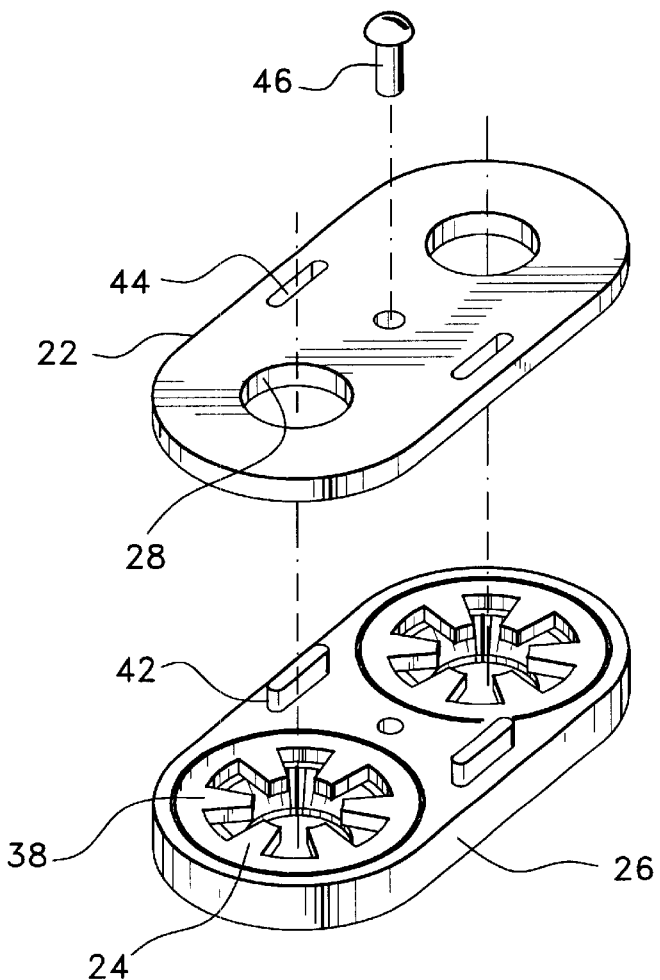
FIG. 5 is an exploded perspective view illustrating the subassembly forming the retainer.
Figure 6:
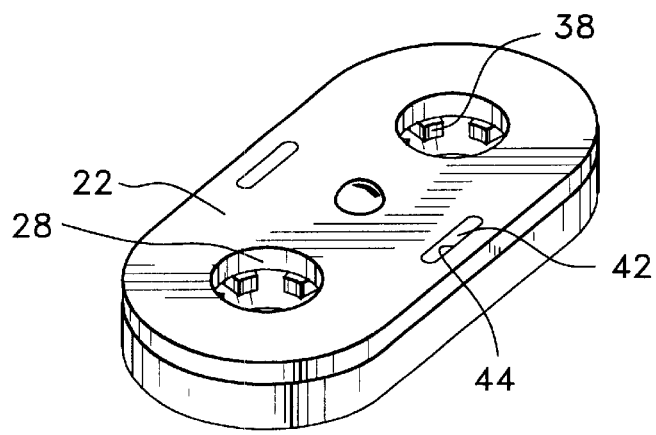
FIG. 6 is a perspective view of the retainer subassembly when assembled prior to coupling to a master link.

Referring now to the drawings, particularly to FIG. 1, there is illustrated a master link generally designated 10 and a retainer subassembly generally designated 12 for use with the master link 10. The master link 10 includes a pair of pins 14, each having adjacent its free or distal end an annular groove 16 and a tapered shoulder 18. The opposite ends of the pins 14 are connected to one another by a plate 20.

The retainer subassembly 12 includes a strap plate 22, a pair of snap rings 24 and a cover plate 26. The strap plate 22 includes a pair of openings 28 spaced from one another corresponding to the spacing of the pins 14 and have diameters slightly larger than the diameters of the pins 14. The cover plate 26 includes a pair of openings 30 spaced one from the other corresponding to the spacing of openings 28 and hence the spacing of pins 14. The openings 30 in cover plate 26 open through a pair of stepped recesses 32 along the inside face of cover plate 26. Each recess 32 includes an enlarged diameter section 34 and a small diameter tapered section 36 terminating in the opening 30.

The snap rings 24 comprise annular disks having a diameter for reception in the larger diameter sections 34 of recesses 32. Each ring 24 includes a plurality of inwardly directed, circumferentially spaced tangs or flanges 38 which, when rings 24 are disposed in recesses 32 register with the recessed sections 36. The inner ends 40 of the flanges 38 form a diameter which lies radially inwardly of the margin of openings 30 for reasons which will become apparent from the ensuing description. The flanges or tangs 38 are also inclined in an axial outward direction to facilitate their insertion over the ends of pins 14. The flanges or tangs 38 thus form detents to prevent removal of the retainer subassembly from the pins.

The strap plate 22, snap rings 24 and cover plate 26 are pre-assembled to form a retainer subassembly for use by an individual for example in the field to assemble a chain. To facilitate their preassembly, cover plate 26 has a pair of projections 42 extending from its inner face for reception in slots 44 formed at corresponding locations in the strap plate 22. With the rings 24 disposed in the recesses 32, the strap plate 22 and cover plate 26 are secured one to the other by a fastener for example a rivet 46 which extends through registering openings in the plates 22 and 26. By peening over the end of the rivet 46 opposite its head, the plates are secured to one another. Other types of fasteners may be used e.g. the plates can be welded or brazed to one another.

Figure 7:
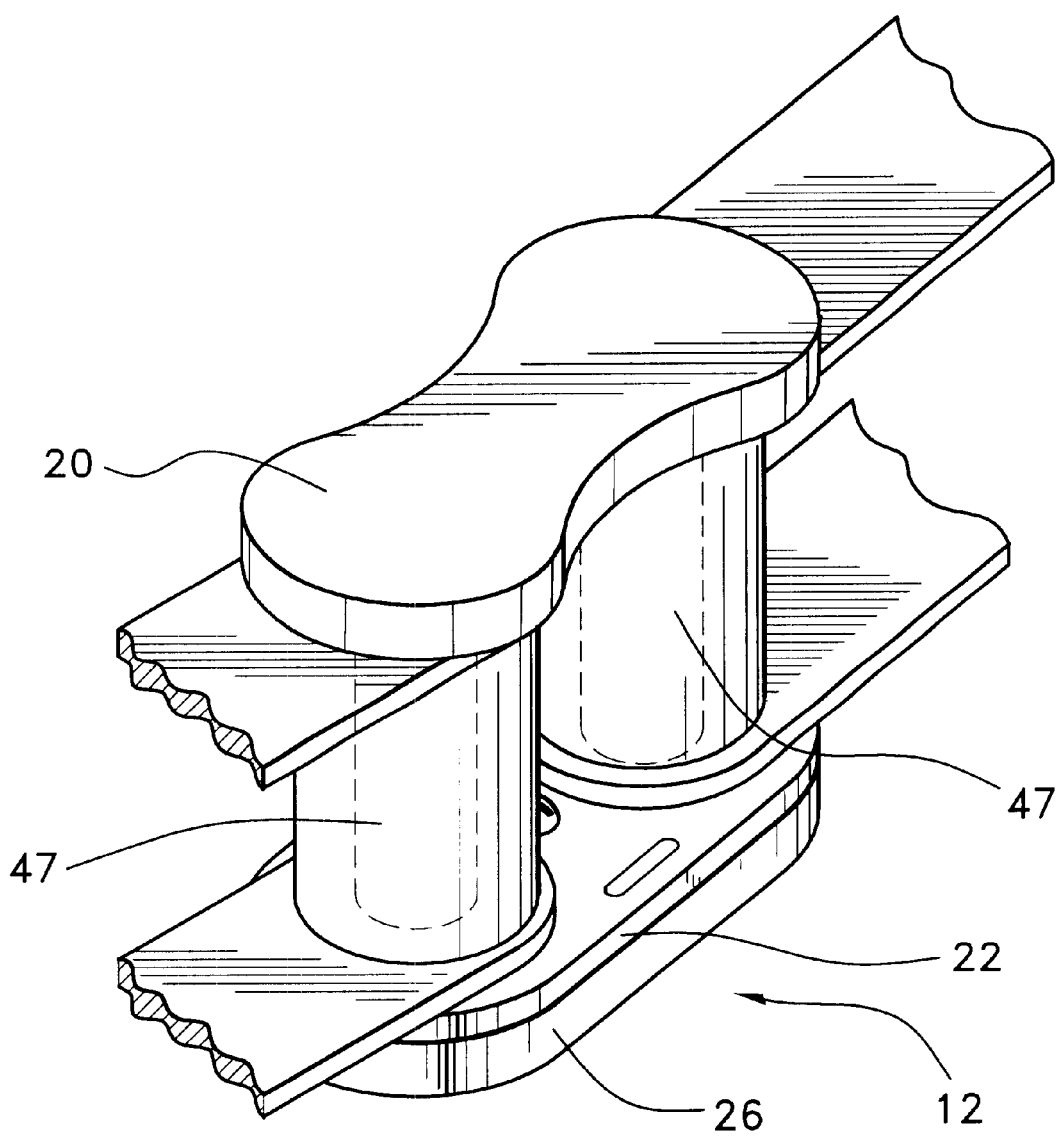
FIG. 7 is a perspective view illustrating the master link and the retainer subassembly in a chain.

In use, it will be appreciated that roller links 47 (FIG. 7) concentrically overlie each of the pins 14 inwardly of the plate 20 and annular groove 16. To retain these roller links on the master link 10, the retainer subassembly 12 is applied to the distal or free ends of the pins 14. Particularly, the retainer subassembly 12 is disposed over the pins 14 with the strap plate 22 first engaging the pin ends. By pressing the retainer assembly further onto the pins 14, it will be appreciated that the flanges 40 of the snap rings are resiliently flexed further axially outwardly as they pass the tapered surfaces 18 of pins 14 and snap back into their relaxed normal position i.e. bent slightly axially outwardly, when in registration in annular grooves 16. With the flanges 38 inclined axially outwardly in their unstressed condition and engaged in groove 16, it will be appreciated that the retainer subassembly cannot be withdrawn from pins 14 and thus the roller links 47 of the chain about pins 14 are retained in the formation of the endless chain. Consequently, the retainer subassembly 12 is simple to install and may simply be pushed manually or with a tool onto the pins 14 until the springs (flanges or tangs 38) of the snap rings 24 are engaged or snapped into place. It will also be appreciated that the retainer subassembly affords a smooth retainer link contour when snapped past the pins of the master link.

In order to disassemble a chain once assembled using the retainer subassembly hereof, the rivet head is simply removed for example by knocking it off with a hammer or a screw driver. Thus the retainer subassembly can be separated and the snap rings 24 removed to release the strap plate from engagement over the pins 14. A slot may be provided between the cover plate or strap plate for receiving the head of a tool e.g. a screwdriver, to force the cover and strap plates apart from one another breaking off the rivet head.

Figure 8:
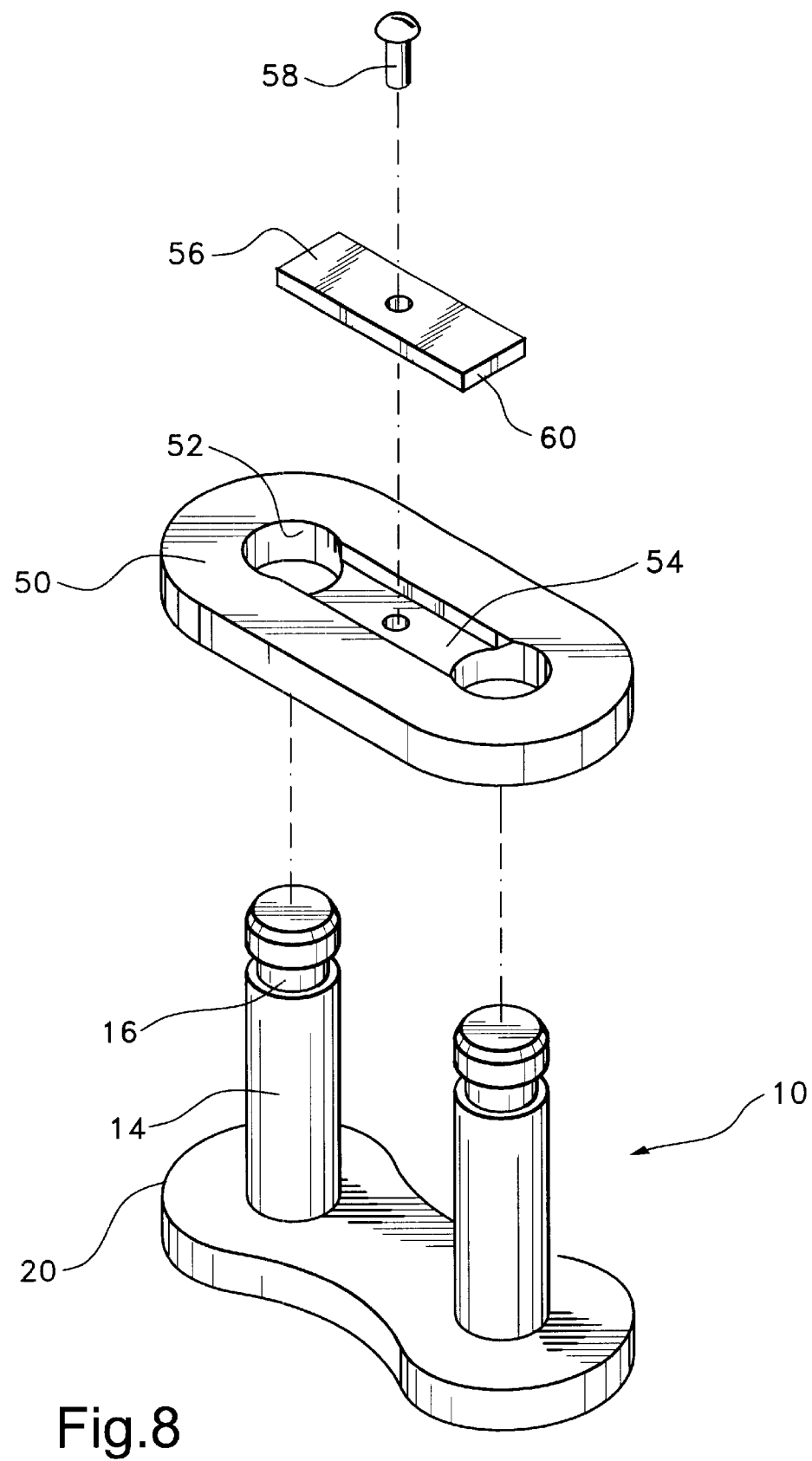
FIG. 8 is a view similar to FIG. 1 illustrating a further form of a retainer subassembly of the present invention.

Referring to FIG. 8, there is illustrated a further form of the present invention. The master link is the same as illustrated in FIG. 1 and like reference numerals have been applied to like parts of that master link. The retainer subassembly in this embodiment, however, includes a retainer plate 50 having a pair of pair of openings 52 spaced one from the other corresponding to the spacing of the pins 14 of the master link 10. The diameters of the openings 52 are slightly larger than the diameters of the ends of the pins 14. The outer face of the retainer plate 50 has an elongated recess 54 extending between the openings 52. A flat leaf spring 56 is received in the recess or groove 54 and secured therein by a fastener for example a rivet 58. The spring 56 is dimensioned such that the ends 60 thereof extend into the openings 52.

To apply the retainer of FIG. 8 to the master link, the retainer plate 50 is applied directly to the ends of pins 14 and pressed onto the pins, similarly as in the preceding embodiment. By pressing the retainer plate 50 onto the pin ends, the ends 60 of the spring 56 are flexed outwardly to permit the retainer plate to pass by the free or distal ends of the pins 14. When the ends 60 of spring 56 register with the annular grooves 16, the spring ends 60 resiliently flex back into the grooves 16 retaining the plate 50 on the master link 10.

Figure 9:
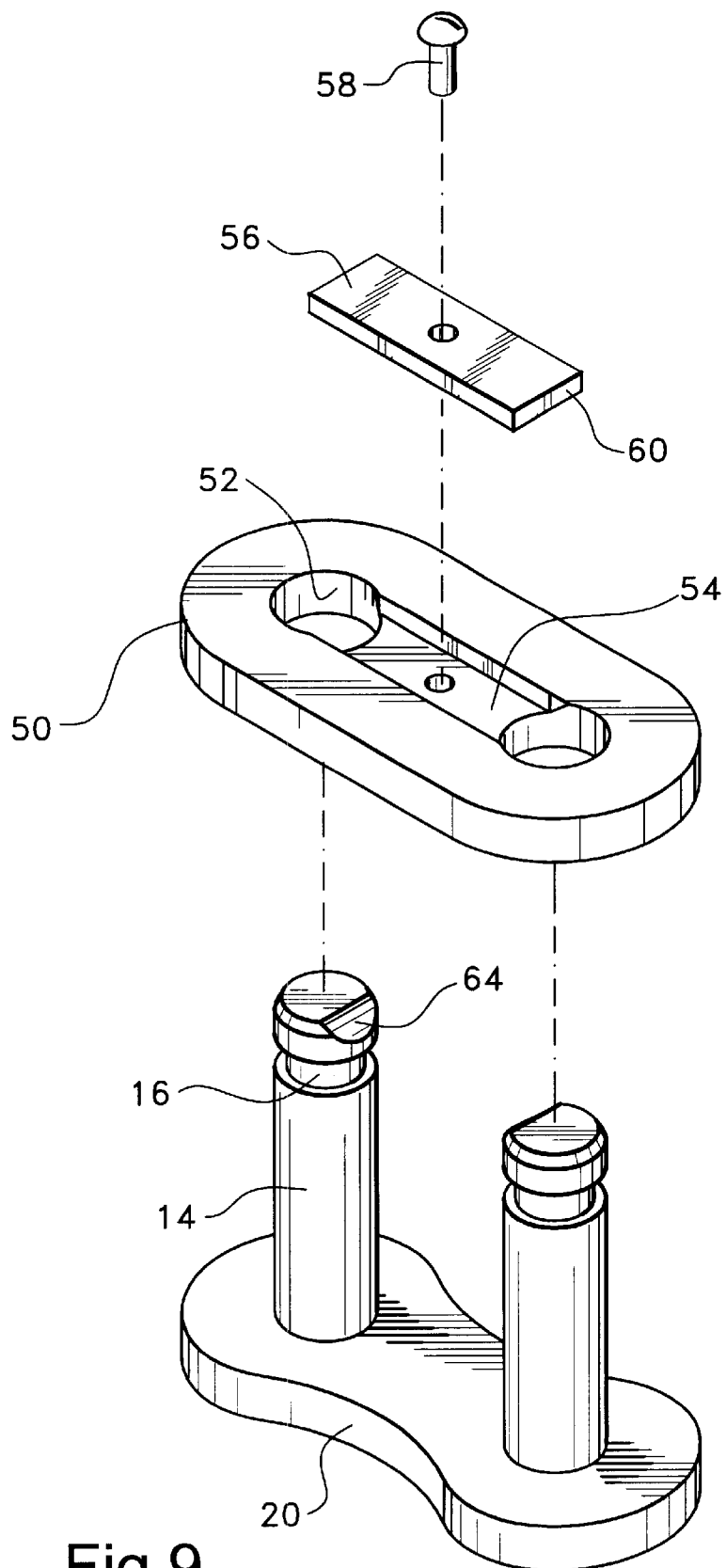
FIG. 9 is a modified form of the retainer subassembly and master link of FIG. 8.

In FIG. 9, the retainer subassembly is identical to that shown in FIG. 8. In FIG. 9 however, the master link 10 has been modified to include a pair of bevelled surfaces 64 along inside facing ends of the pins 14. The bevelled or tapered surfaces 64 facilitate displacement of the spring ends 60 in an outward direction such that ends 60 can slip past the distal ends of the pins and engage in the grooves 16 of pins 14.

Figure 10:
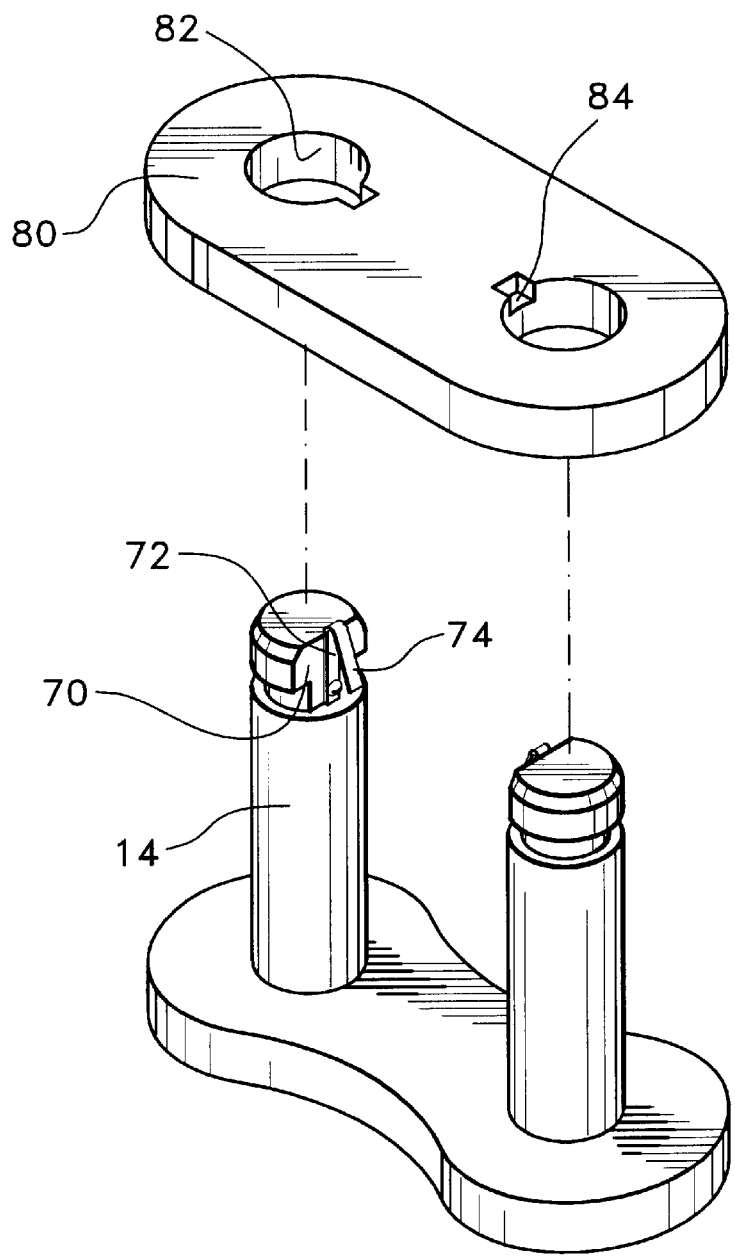
FIG. 10 is a view similar to FIG. 8 illustrating a further form of a retainer subassembly according to the present invention.

Referring now to the embodiment of the invention illustrated in FIG. 10, there is illustrated a master link having modified pin ends. For example, the pins 14 of the master link 10 have a side segment of their ends removed forming a flat lateral face 70 facing one another. Secured to each flat face is a leaf spring 72 bent intermediate its ends to form leaf spring legs 72 and 74, leg 72 being secured to the pin 14 along its lateral face 70. The leg 74 terminates at a location spaced laterally outwardly of the pin 14. The retainer plate 80 of FIG. 10 has a pair of openings 82 spaced similarly from one another as pins 14 are spaced. The openings 82 additionally have steps 84 formed along the outside surfaces of plate 80 for receiving the ends of the spring legs 74. To apply the retainer 80 to the master link 14 illustrated in FIG. 10, retainer 80 is pushed onto the pins 14. As the plate 80 is applied to pins 14, each spring leg 74 resiliently flexes toward its opposite secured leg 72 to permit the plate 80 up to the stepped portion 84 to pass substantially by the spring leg 74. When the tip of each spring leg 74 registers in the step 84 of plate 80, the spring leg 74 springs away from the pin into the step 84 engaging the horizontal and vertical surfaces of the step 84 preventing removal or outward movement of plate 80 relative to pins 14.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A retainer subassembly for a master link of a chain wherein the master link includes a pair of pins terminating at respective opposite free ends, each free end having an annular groove and a link connecting the opposite ends of the pins to one another, the retainer assembly comprising:

a cover plate having a pair of spaced openings for receiving distal ends of the pins of the master link with the annular grooves therein;

a pair of discrete rings each having a central opening for receiving a pin end, an axis and detents flexible in a direction generally parallel to the axis for engaging a groove of the pin; and means for securing said rings and said cover plate to one another, said securing means including a strap plate having a pair of spaced openings for receiving distal ends of the pins, each opening of said rings lying in registry with an opening of said plates, said rings being secured in said subassembly between the plates, said cover plates having recesses for receiving said rings and registering with the openings therethrough of a sufficient depth to enable said detents to flex in said direction when said strap plate and said cover plate are secured to one another.

2. A retainer subassembly for engaging a master link having a pair of pins terminating at free ends each having an annular groove, and a link plate connecting the pins to one another at opposite ends thereof comprising:

a cover plate having a pair of spaced openings for receiving the free ends of the pair of pins of the master link, said cover plate having a pair of recesses along one side thereof about said openings;

a pair of rings each having a central opening for receiving a pin end and flexible detents for engaging the pin in the groove thereof, said rings being disposed in said recesses with said spaced openings of said cover plates and the openings of said rings in respective registry with one another;

a strap plate overlying said one side of said cover plate and said rings; and a fastener securing said cover plate and said strap plate to one another with said rings therebetween to form the retainer subassembly for the master link;

each of said rings having a plurality of circumferentially spaced, radially inwardly directed projections for engaging in the groove of a corresponding pin, the projections being inclined outwardly toward said cover plate; and said recesses including a pair of stepped recesses of different diameters, a smaller diameter recess thereof receiving the outwardly inclined projections of the rings.

3. Apparatus for assembly links of a chain comprising:

a master link having a pair of pins terminating in free ends each having an annular groove and a link connecting opposite ends of said pins to one another;

a retainer subassembly;

said subassembly including a cover plate having a pair of spaced openings for receiving the free ends of the pair of pins of the master link, said cover plate having a pair of recesses along one side thereof about said openings;

a pair of discrete rings each having a central opening for receiving a pin end, an axis through each said opening generally perpendicular to a plane containing said ring and flexible detents for engaging the pin in the groove thereof, said rings being disposed in said recesses with said spaced openings of said cover plates and the openings of said rings in respective registry with one another;

a strap plate overlying said one side of said cover plate and said rings; and a fastener securing said cover plate and said strap plate to one another with said rings therebetween to form the retainer subassembly for the master link;

said detents of said rings being flexible in a direction generally parallel to said axes thereof to enable a press fit of the retainer subassembly onto the pins of the master link in a direction generally parallel to the axes of the rings and engagement of the detents in the grooves of the pins.

4. A retainer subassembly for engaging a master link having a pair of pins terminating at free ends each having an annular groove, and a link plate connecting the pins to one another at opposite ends thereof comprising:

a cover plate having a pair of spaced openings for receiving the free ends of the pair of pins of the master link, said cover plate having a pair of recesses along one side thereof about said openings;

a pair of discrete rings each having a central opening for receiving a pin end, an axis through each said opening generally perpendicular to a plane containing said ring and flexible detents for engaging the pin in the groove thereof, said rings being disposed in said recesses with said spaced openings of-said cover plates and the openings of said rings in respective registry with one another;

a strap plate overlying said one side of said cover plate and said rings; and a fastener securing said cover plate and said strap plate to one another with said rings therebetween to form the retainer subassembly for the master link;

said detents of said rings being flexible in a direction generally parallel to said axes thereof to enable a press fit of the retainer subassembly onto the pins of the master link in a direction generally parallel to the axes of the rings and engagement of the detents in the grooves of the pins.

5. A retainer subassembly according to claim 4 wherein said detents of each of said rings includes a plurality of circumferentially spaced, radially inwardly directed projections for engaging the groove of a corresponding pin.

6. A retainer subassembly according to claim 4 wherein said fastener comprises a rivet connecting said cover plate and said strap plate to one another.

7. A retainer subassembly according to claim 4 wherein said detents of each of said rings has a plurality of circumferentially spaced, radially inwardly directed projections for engaging in the groove of a corresponding pin, the projections being inclined outwardly toward said cover plate and out of the plane of said ring.

8. A retainer subassembly according to claim 4 wherein the surfaces of said rings facing said strap plate lie flush with the surface of said cover plate facing said strap plate.

9. A retainer subassembly according to claim 4 including guides on said strap plate and said cover plate for orienting the plates relative to one another.

* * * * *